United States Patent [19]

Fish

[11] 3,800,082

[45] Mar. 26, 1974

[54] AUDITORY DISPLAY FOR THE BLIND
[75] Inventor: Raymond M. Fish, Bethesda, Md.
[73] Assignee: The United States of America as represented by the Administrator of the National Aeronautics and Space Administration, Washington, D.C.
[22] Filed: Oct. 27, 1972
[21] Appl. No.: 301,417

[52] U.S. Cl............... 178/7.2, 35/35 A, 178/5.8 R, 178/DIG. 32, 340/407
[51] Int. Cl. ............................................ H04n 5/30
[58] Field of Search............... 178/5.6, 5.8 R, 6, 6.8, 178/DIG. 32; 35/35 A; 340/407

[56] References Cited
UNITED STATES PATENTS
1,352,940  9/1920   Brown................................. 35/35 A
1,820,357  8/1931   Lindstrom et al. ................. 35/35 A
3,007,259  11/1961  Abma et al. ......................... 35/35 A
3,369,228  2/1968   Foster............................ 178/DIG. 32
3,676,938  7/1972   Trehub .............................. 35/35 A Primary Examiner—Robert L. Richardson
Attorney, Agent, or Firm—John R. Manning; John H. Warden

[57] ABSTRACT

A system for providing an auditory display of two-dimensional patterns as an aid to the blind includes a scanning device, such as a slow scan television camera, for producing first and second voltages respectively indicative of the vertical and horizontal positions of the scan and a further voltage indicative of the intensity at each point of the scan and hence of the presence or absence of the pattern at that point. The vertical position of the scan is represented aurally by the frequency of the tone heard, the first voltage being used to control the frequency output of a VCO. The horizontal position of the scan is represented aurally by the interaural difference between two tones presented so that a point on the left side of a pattern is indicated by a relatively loud sound in the left ear. The voltage related to scan intensity controls transmission of the sounds to the subject so that the subject knows that a portion of the pattern is being encountered by the scan when a tone is heard, the subject determining the position of this portion of the pattern in space by the frequency and interaural difference information contained in the tone.

15 Claims, 5 Drawing Figures

PATENTED MAR 26 1974 3,800,082

AUDITORY DISPLAY FOR THE BLIND

GOVERNMENT RIGHTS

The invention described herein was made under a grant of the United States Government and may be manufactured and used by or for the Government for governmental purposes without the payment of any royalties thereon or therefor.

BACKGROUND OF THE INVENTION

There are about one-half million blind people in the United States at the present time and a great time of research has been focussed on finding ways to aid the blind in "reading" and "seeing." In addition to more familiar techniques such as Braille, substantial work has been done in presenting printed materials to the blind in the form of coded sounds. Generally speaking, devices of this type, often called optophones, convert a light image of the material to be "read" into a corresponding electrical signal using optical-electronic transducers such as photo-cells. This electrical signal is used to control the output of a variable frequency oscillator or oscillators so that a distinctive tone is generated. There are numerous examples of such devices in the patented art and reference is made to U.S. Pat. Nos. 2,412,467 (Morton); 2,487,511 (Bedford); 2,582,728 (Walker); 2,615,992 (Flory et al.); 3,007,259 (Abma et al.); 3,229,075 (Palti); 3,359,425 (Smith); and 3,676,938 (Trehub) for examples of aural "reading" systems. Although it would not be worthwhile to discuss the disadvantages of individual systems in any detail, in general, the systems range from those which suffer from an inability to represent any patterns other than the very simplest, on the one hand, to those which the coding used in identifying letters or shapes is so complex that learning is difficult, on the other. Other disadvantages include complexity, high cost and maintenance difficulties.

SUMMARY OF THE INVENTION

In accordance with the invention, an auditory display system is provided which eliminates the need for the complex coding employed in many prior art systems and which eliminates, or reduces the effect of, other problems associated with prior art systems.

In general, the system of the invention provides a two-dimensional spatial representation of the image pattern to be "viewed." The pattern is scanned using raster or line scanning and the X-Y position of the scan is indicated aurally. The subject wears binaural headphones and the horizontal position of the scan is "coded" using differences in the interaural intensity of the sounds heard by the subject, that is, by varying the amplitude of the sounds heard by the subject in his left and right ears in accordance with the horizontal position in the scan. The vertical position of the scan is coded by frequency, higher positions of the scan producing higher audio frequencies and lower positions producing lower frequencies. Thus, with the scan located in the upper left hand corner of the field to be scanned, a high pitched sound which would be loudest in the left ear would be heard, which sound, because of the coding, woyld appear to be coming a corresponding position in space. To present a predetermined pattern to a subject the sound is transmitted only when the scan crosses the pattern so that the subject can construct the pattern spatially in his mind in accordance with the seeming locations of the sounds, and their durations. This coding system has proved to be very natural and easy to learn, a number of subjects having mastered it by listening to tape recordings lasting only one half hour.

According to presently preferred embodiments thereof, the auditory display system of the invention, the pattern is scanned using an oscilloscope, television camera or the like and voltage signals corresponding to the horizontal and vertical position of the scan are derived. The "vertical" voltage signal, preferably after shaping using a function generator, is used to drive a voltage controlled oscillator which thus produces a frequency output in accordance with the vertical position of the scan. The function generator is used to cause the frequency to vary in an exponential manner with height since, to a first approximation, the ear responds to the logarithm of frequency. The "horizontal" voltage is used to control the amplitude of the sound heard by the subject in accordance with the horizontal position of the scan and, in accordance with a preferred embodiment, is applied to first and second function generators connected respectively to the left and right earphones of the headset referred to above, one of the inputs being inverted beforehand. The function generators preferably comprise variable diode function generators each of which generates a roughly exponential function of the horizontal position of the scan. A pair of analog multipliers are used to make the audio outputs of this variable frequency oscillators follow the exponential waveforms generated by the function generators and the resultant outputs are applied to the left and right earphones.

A further signal porportional to intensity of the scan is used to control the input to the headphones so that no sound is heard when the scan is out of register with the pattern. This is preferably accomplished by electronic switch connected in series with the voltage controlled oscillator and controlled by an intensity signal derived from the television camera or a control signal derived from a photomultiplier tube positioned to receive light from the scanning dot of the oscilloscope.

Further features and advantages of the invention will be set forth in, or apparent from, the detailed description of the preferred embodiments found hereinbelow.

DESCRIPTION OF THE PREFERRED EMBODIMENTS

Figure 1:
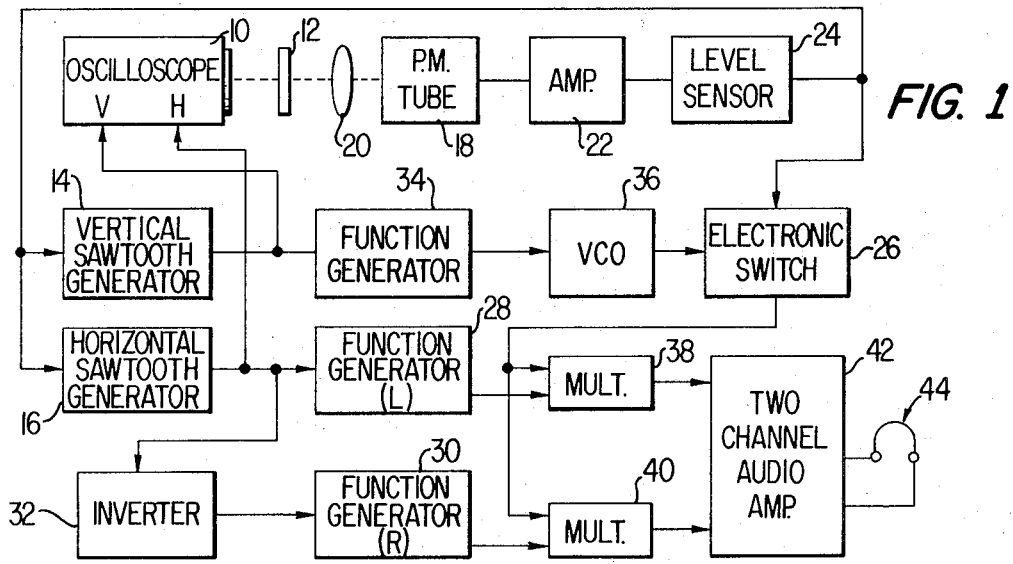
FIG. 1 is a schematic circuit diagram, in block form, of an auditory display system in accordance with a first embodiment of the invention.

Referring to FIG. 1, a first embodiment of the auditory display system of the invention is shown. The system uses "flying spot" scanning techniques to scan the pattern to be displayed and to this end an oscilloscope 10 is provided which scans an image pattern indicated at 12. In experimental use of the invention the pattern used has been formed by pieces of cardboard which are pasted or otherwise affixed to the screen of the oscilloscope. The vertical and horizontal position of the oscilloscope scan, i.e., the position of the dot of light on the oscilloscope screen, are respectively determined by the output voltages from a vertical sawtooth generator 14 and a horizontal sawtooth generator 16. For a scan of twenty horizontal lines, the frequency of horizontal sawtooth generator 16 is made to be twenty times that of the vertical sawtooth generator 14.

It will be appreciated that light from the moving dot on the screen of oscilloscope 10 will be blocked by image pattern 12 which behind this pattern and will be transmitted for areas outside of pattern 12. A photomultiplier tube 18 is used to detect the transmitted light, which is focussed thereon by a suitable lens system indicated by lens 20, and to produce an output voltage in accordance therewith. The output of photomultiplier tube 18, after amplification by amplifier 22, is applied in the input of a level sensor 24. Level sensor 24 controls switching of an electronic switch 26 such that when there is no light input to photomulplier 18, corresponding to the dot of light from the oscilloscope 10 being blocked by pattern 12, switch 26 is turned on and, as explained hereinbelow, sound is permitted to reach the subject. When light is detected, switch 26 is turned off, resulting in silence.

Figure 2:
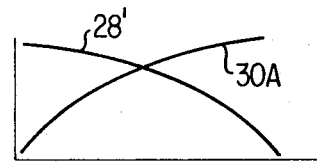
FIGS. 2 and 3A and 3B are waveforms associated with the system of FIG. 1 used in explaining the operation of that system.

In addition to controlling the horizontal motion of the dot of light on the screen of oscilloscope 10, horizontal sawtooth generator 16 is used as an input to first and second function generators 28 and 30. Function generators 28 and 30 preferably comprise variable diode function generators (VDFGs), which produce an output voltage which is a function of the horizontal position of the scanning dot of oscilloscope 10. An inverter 32 is connected in front of the input to function generator 30 so that the input thereto is the inverse of that of function generator 28. The output voltages of VDFGs 28 and 30 are shown in FIG. 2, with curve 28A corresponding to the output of generator 28 and curve 30A corresponding to output of generator 30. These voltages are preferably roughly exponential functions of the horizontal position of the scanning dot because the ear responds approximately logarithmically to the sound intensity.

Vertical sawtooth generator 14 also performs a second function in addition to controlling the vertical position of the scanning dot, the output of vertical sawtooth generator 14 being used to control the frequency of a voltage controlled oscillator (VCO) 36. More specifically, the output of sawtooth generator 14 is connected to a further function generator 34 which can also be a VDFG and which, similarly to VDFGs 28 and 30, produces an output voltage which is an exponentional function of the vertical position of the scanning dot. This voltage controls the frequency output of VCO 36, an exponential voltage being used because, to a first approximation, the ear responds logarithmically to frequency. By varying the frequency of VCO 36 in accordance with the vertical position of the scan, the resultant sound heard by a subject is made to seem to come from a corresponding position in the scanned pattern. Thus, high frequency tones seem to originate from high positions in the scan and lower frequency tones seem to originate from lower positions. See Roffler et al., *Factors That Influence the Localization of Sound in the Vertical Plane*, JASA 43, 1255-1259, 1968 and Roffler et al., *Localization of Tonal Stimuli in the Vertical Plane*, JASA 43, 1260-1266, 1968.

Figure 3A:
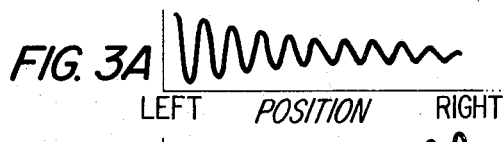
Figure 3B:
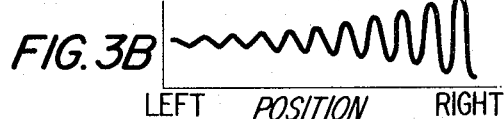

Switch 26 controls the connection of the output of VCO 36 to first and second analog multipliers 38 and 40. With switch 26 turned on, the outputs of VDFGs 28 and 30 are multiplied by the audio output of VCO 36 to obtain the waveforms which are actually heard by the subject, the outputs of multipliers 38 and 40 being connected through a dual channel audio amplifier 42 to the left and right earphones of a headphone set 44. The audio waveforms, as a function of horizontal position, for the signals transmitted to the left and right ears are shown in FIGS. 3A and 3B. As illustrated, the sound volumes are equal at the center of the scan. In an exemplary embodiment, the sound volumes change 40db from one side to the other and the frequency varies from 5,000 Hz at the top of the scan to 200 Hz at the bottom. Sine, triangular and square audio waveforms have been used and found to be satisfactory.

The output of level sensor 24 can also be used to slow the scan rate when the oscilloscope beam, i.e., scanning dot, is behind the pattern and, to this end, this output is connected to vertical and horizontal sawtooth generators 14 and 16. This arrangement permits rapid scanning when no sound is transmitted to the subject and slower scanning when a portion of the pattern 12 is encountered. The changing of sweep rates allows patterns to be scanned more quickly and has not been found to be confusing to subjects. It will be appreciated the outlines of the pattern shapes can be presented much more rapidly with this approach than where the scanning dot goes slowly from one side of the figure to the other. Instead, the dot seems to jump from one side to the other, waiting a few tens of milliseconds while a tone is presented corresponding to each time the edge of the pattern is encountered.

Figure 4:
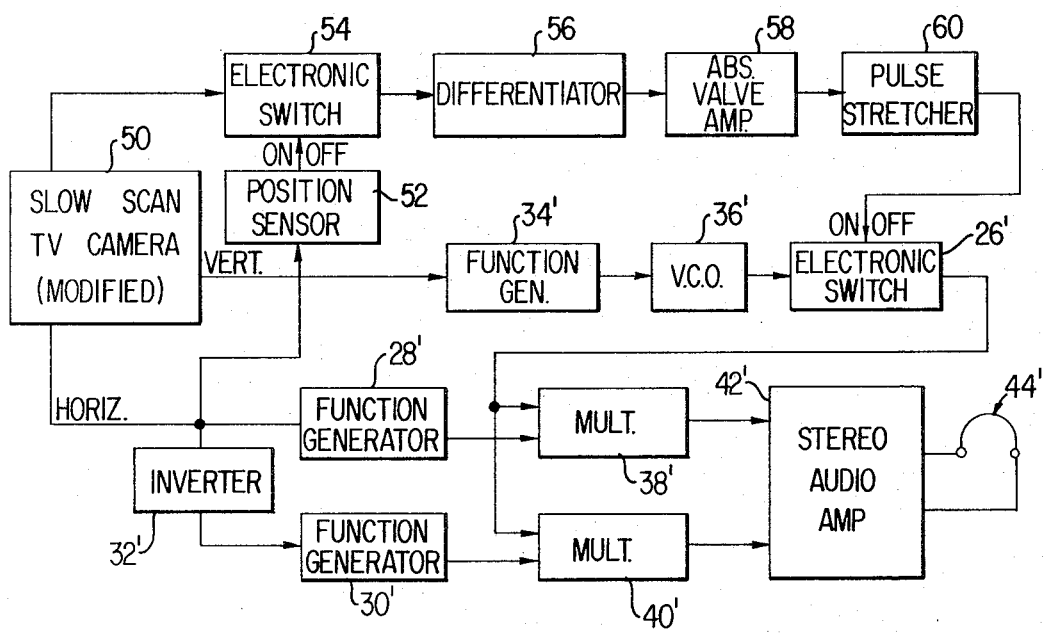
FIG. 4 is a block-form schematic diagram of a second embodiment of the invention.

Referring to FIG. 4, an alternate embodiment of the invention is shown. This embodiment is similar to that of FIG. 1 and like elements have been given the same numbers with primes attached. In this embodiment, the image pattern or picture is scanned by the raster pattern generated by a modified slow scan TV camera 50 such as a Robot Research Model 80. The camera 50 is modified to produce 0 to +10 volt D.C. signals representative of the vertical and horizontal position of the scan. In an exemplary embodiment, a scan lasting 8 seconds and containing 30 horizontal lines was used. A further D.C. voltage is produced which is proportional to the light intensity at each point in the scan and hence generally corresponds to the output of the photomultiplier of FIG. 1.

To eliminate extra blanking pulses generated by camera 50, a position sensor 52 is connected to the horizontal output and is used to control switching of a further electronic switch 54. The input of switch 54 is connected to the intensity output of camera 50 so that transmission of this output is controlled in accordance with the horizontal position of the scan.

The output of switch 54 is differentiated by differentiator 56 the output of which is, in turn, processed by an absolute value amplifier 58 and a pulse stretcher 60 before application to electronic switch 26'. The remainder of the system is similar to that of FIG. 1. Considering the operation of the systems of the invention, pictures or image patterns are presented to subjects are scanned with a raster scan using the oscilloscope 10 of FIG. 1 or the television camera 50 of FIG. 4. It will be appreciated that raster scanning refers to scanning from top to bottom and left to right much as one reads print on a page. In general terms, when the scan crosses a part of the object to be presented, switch 26 or 26' is actuated and a sound is heard by the subject. The pitch of the sound is high when the scan is near the top of the picture and as the scan approaches the bottom, the pitch decreases exponentially. If the part of the pattern is on the left, the volume is louder in the left earphone of headphones 44 and hence the sound source appears to be on the left. Similarly, if the part of the pattern is on the right the volume will be louder for the right earphone. Although it may be difficult to understand what the sounds are like without hearing them, a description of the sounds associated with a particular pattern might be helpful. Thus, the sounds representing the outline of a triangle as scanned by the system in FIG. 1 would begin with a single high frequency tone burst of equal volume in both ears (assuming the triangle is centered) corresponding to the scan hitting the apex of the triangle. As the scan progresses downward, the frequency of the tones decrease and almost immediately two distinct tone bursts are presented, one toward the left and one toward the right. The tones seem to grow farther apart with each new horizontal scan line until the bottom side of the triangle is reached. At this time, the tone stays on continuously as the scan goes from the far left to the far right. Further, the volume gradually decreases in the left earphone and gradually increases in the right earphone during this scan.

It should be noted that signals other than variable amplitude signals can be used to indicate the horizontal position of the scan and that, for example, signals delayed with respect to one another or differing in phase can be used to produce the same effect. Further, an array of solid state light detectors such as photodiodes might be substituted for the television and oscilloscope scanning arrangements described hereinabove.

Experimental testing of the invention has proved very satisfactory, the "coding" of the figures or patterns presented being natural and easy to understand. In fact, nine and ten year old blind children have learned to identify patterns as complex as nine and eleven pointed starts with only 4 hours of training. The invention, particularly where a portable television camera is used corresponding to that discussed above in connection with FIG. 2, can also be used as a mobility aid to present an auditory "picture" of a room to a blind person so that he can "see" the positions of the furniture in the room. Because an auditory rather than tactile display is provided the system can also be used to represent the spatial pattern of Braille dots to blind people with injured hands, the aged blind and the diabetic blind. These last two groups may include many people who have their sense of touch so impaired by age or disease that they cannot read ordinary Braille. These uses are, of course, exemplary and are not intended to be exhaustive.

Although the invention has been described relative to exemplary embodiments thereof, it will be understood that variations and modifications can be effected in these embodiments without departing from the scope and spirit of the invention.

I claim:

1. A system for producing a two-dimensional auditory representation of an image pattern, said system comprising
    scanning means for scanning the image pattern;
    means for generating a variable frequency signal the frequency of which varies in accordance with the vertical position of the scan;
    means for generating separate electrical signals for each ear of a user which vary in amplitude in accordance with the horizontal position of said scan;
    means for combining said variable frequency signal and said separate electrical signals into corresponding auditory signals for each ear of a user representative of the vertical and horizontal position of the scan;
    means for generating a control signal related to the image pattern scanned by said scanning means; and
    means for controlling the auditory signals heard by the user in accordance with said control signal.

2. A system as claimed in claim 1 further comprising headphones connected to the output of said combining means and including left and right earphones, said means for generating separate electrical signals including means for producing a first variable amplitude signal and means for generating a second variable amplitude signal, said first variable signal being connected to said left earphone and said second variable amplitude signal being connected to said right earphone through said combining means.

3. A system as claimed in claim 2 wherein said combining means comprises analog multiplier means.

4. A system as claimed in claim 2 wherein said first and second variable amplitude signal generating means respectively comprise first and second function generator means for generating a signal whose amplitude varies approximately exponentially with the horizontal position of the scan, one of said first and second variable amplitude signals being the inverse of the other.

5. A system as claimed in claim 4 wherein said function generator means each comprise a variable diode function generator.

6. A system as claimed in claim 4 wherein said variable frequency signal generating means includes a voltage controlled oscillator.

7. A system as claimed in claim 6 wherein said variable frequency signal generating means further comprises further function generator means for generating an output signal the amplitude of which varies approximately exponentially with the vertical position of the scan and which is connected to the input of said voltage controlled oscillator.

8. A system as claimed in claim 7 wherein said first and second function generator means and said further function generator means each comprise variable diode function generators.

9. A system as claimed in claim 7 wherein said scanning means comprises a television camera including means for generating a first D.C. voltage whose amplitude varies in accordance with the vertical position of the scan, means for generating a second D.C. voltage whose amplitude varies in accordance with the horizontal position of the scan and a third D.C. voltage whose amplitude varies in accordance with the intensity of the scan, said system further comprising means for processing said third D.C. voltage to produce said control signal.

10. A system as claimed in claim 9 wherein said signal processing means comprises differentiator means, said means for controlling the auditory signals heard by the user comprising an electronic switch controlled by said control signal and connected to the output of said variable frequency oscillator.

11. A system as claimed in claim 7 wherein said scanning means comprises an oscilloscope, a vertical sawtooth generator for generating a vertical control voltage for controlling the vertical scan position of said oscilloscope, a horizontal sawtooth generator for generating a horizontal control voltage for controlling the horizontal scan position of said oscilloscope, the output of said horizontal sawtooth generator being connected to the inputs of said first and second function generator means and the output of said vertical sawtooth generator being connected to the input of said further function generator; photomultiplier tube means for receiving light from said oscilloscope as modulated by the image pattern; and level sensor means connected to the output of said photomultiplier tube means for producing said control signal.

12. A system as claimed in claim 11 wherein said means for controlling the auditory signals heard by the user comprises electronic switch connected to the output of said level sensor meand and to the output of said voltage controlled oscillator.

13. A system as claimed in claim 11 further comprising means for connecting the output of said level sensor means back to the inputs of said vertical and horizontal sawtooth generators for controlling the scanning rate of said oscilloscope in accordance with the output of the level sensor means.

14. A system as claimed in claim 1 wherein said combining means comprises first and second analog multiplier means, said means for controlling the auditory signals heard by the user comprising electronic switch means responsive to said control signal for controlling connection of said variable frequency signal to the input of said analog multiplier means.

15. A system for producing a two-dimensional auditory representation of an image pattern, said system comprising scanning means for scanning the image pattern;

means for generating a variable frequency signal the frequency of which varies in accordance with the vertical position of the scan;

means for generating separate electrical signals for each ear of a user which vary in phase in accordance with the horizontal position of said scan;

means for combining said variable frequency signal and said separate electrical signals into corresponding auditory signals for each ear of a user representative of the vertical and horizontal position of the scan;

means for generating a control signal related to the image pattern scanned by said scanning means; and means for controlling the auditory signals heard by the user in accordance with said control signal.

* * * * *